(12) United States Patent
Bakin (10) Patent No.: US 7,215,479 B1
(45) Date of Patent: May 8, 2007

(54) INTEGRATED LENS SYSTEM FOR IMAGE SENSOR AND METHOD FOR MANUFACTURING THE SAME

(75) Inventor: Dmitry Bakin, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/350,772

(22) Filed: Feb. 10, 2006

(51) Int. Cl.
*G02B 3/00* (2006.01)
(52) U.S. Cl. .................. 359/664; 359/754; 359/784
(58) Field of Classification Search ........... 359/664, 359/754–792
See application file for complete search history.

(56) References Cited

U.S. PATENT DOCUMENTS

| 5,323,268 A * | 6/1994 | Kikuchi ............... 359/664 |
| 6,747,805 B2 | 6/2004 | Sayag |
| 6,950,242 B2 | 9/2005 | Sayag |

* cited by examiner

*Primary Examiner*—Scott J. Sugarman
*Assistant Examiner*—Darryl J. Collins
(74) *Attorney, Agent, or Firm*—Dickstein Shapiro LLP (57) ABSTRACT

A lens system including a first substantially hemispherical lens, a second spherical lens and a third substantially hemispherical lens. The lenses are held together by a bonding material such as epoxy, which may also include a light absorbing dye. The invention also relates to a low-cost method of manufacturing the lens system out of glass, using low cost glass ball lenses to create the hemispherical lenses.

63 Claims, 9 Drawing Sheets

INTEGRATED LENS SYSTEM FOR IMAGE SENSOR AND METHOD FOR MANUFACTURING THE SAME

FIELD OF THE INVENTION

The present invention relates to the field of semiconductor devices and, in particular, to an integrated lens system for image sensors.

BACKGROUND OF THE INVENTION

Integrated circuits including a semiconductor die, such as charge-coupled-devices (CCD) and complementary metal oxide semiconductor (CMOS) sensors, have commonly been used in photo-imaging applications. Such sensors typically contain thousands or millions of pixel cells in a pixel array on a single chip. Pixel cells convert light into an electrical signal that can then be stored and recalled by an electrical device such as, for example, a processor.

Figure 1:
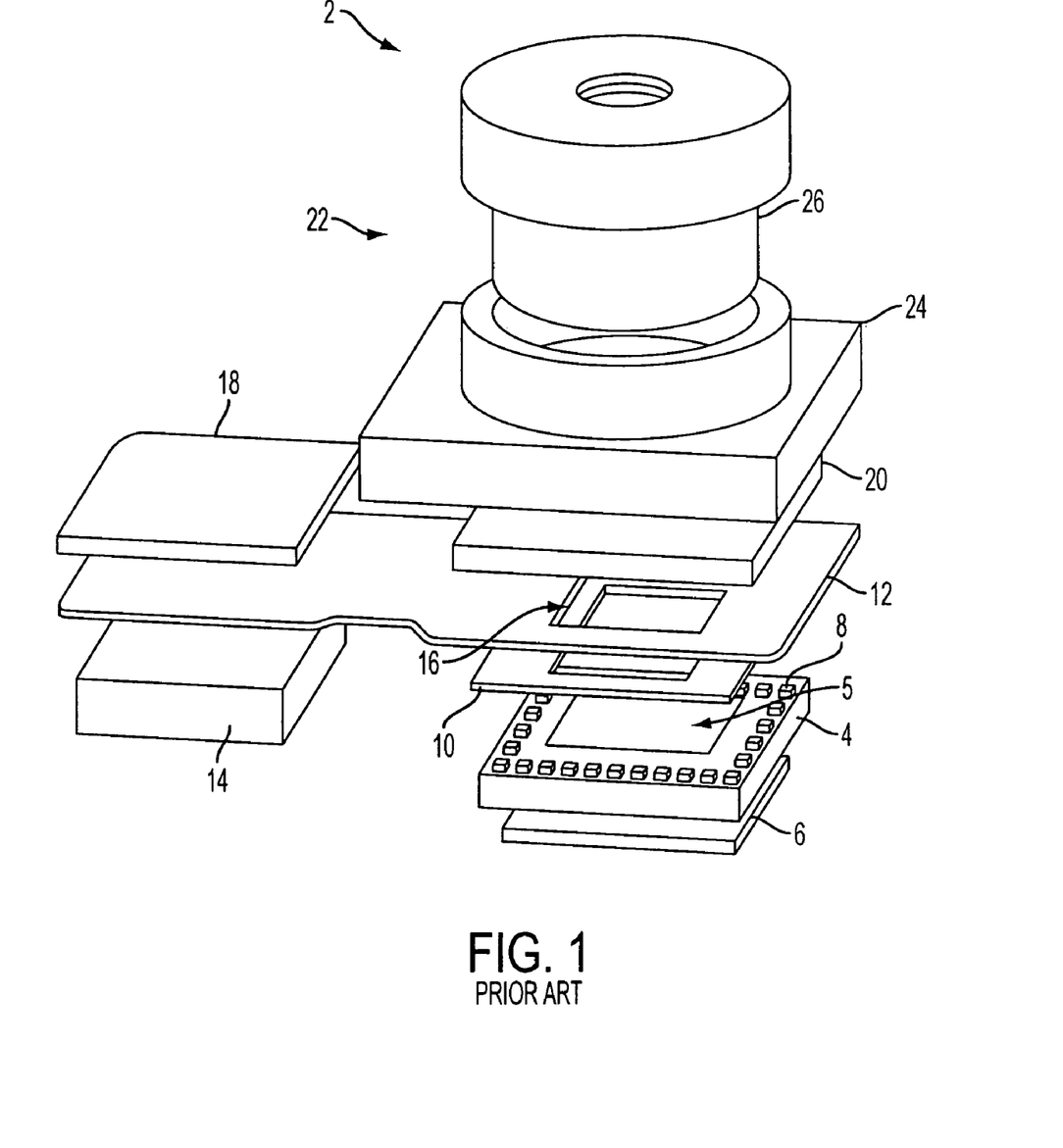
FIG. 1 depicts as typical semiconductor image sensor module of the prior art.

Semiconductor dies typically are packaged and inserted into imaging devices such as, for example, digital cameras. FIG. 1 illustrates a conventional image sensor module 2, shown in an exploded perspective view. Module 2 includes a semiconductor die 4 disposed on a cushion 6 and having a series of bump pad connectors 8 located adjacent the four edges of the top surface of the semiconductor die 4. Semiconductor die 4 includes a pixel array 5. Conductive film 10 connects flex tape 12 to die 4 and connectors 8. Flex tape 12 contains electrical traces that link to a connector 14, and has an opening 16 through which light travels to the pixel array. A stiffener 18 provides additional support to the module 2. An infrared (IR) filter 20 may be provided which is aligned in the optical path between the pixel array and a lens assembly 22 and is adhered onto the flex tape 12. The lens assembly 22 includes a housing 24 supporting a lens barrel 26 containing a lens system for focusing light onto the pixel array. The lens system is aligned within the lens barrel 26 and is secured at a focusing distance from the surface of the pixel array located on the semiconductor die 4 in order to provide a sharp image.

Figure 2A:
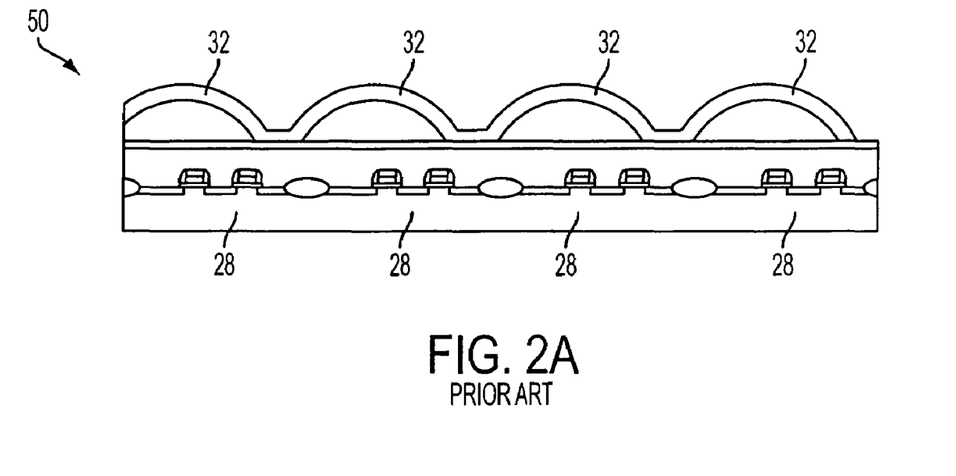
FIG. 2A is a side cross-sectional view of an imager having a micro-lens array in accordance with the prior art.
Figure 2B:
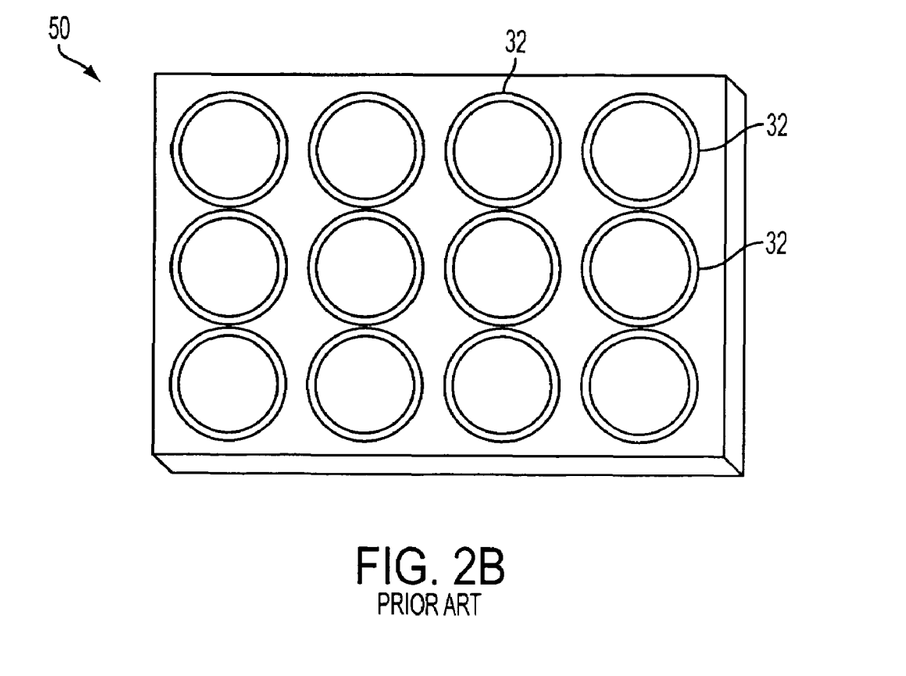
FIG. 2B is a top view of the micro-lens array of FIG. 2A.

To increase the pixel response to illumination, an array of micro-lenses 32 may be placed above each photosensitive pixel cell 28 of pixel array 5, as shown in the imager 50 of FIGS. 2A and 2B. The micro-lenses 32 are used to focus electromagnetic radiation onto the photo-conversion device, e.g., a photodiode of the pixel cells 28. The centers of the micro-lenses 32 in the array may be aligned with the center of the corresponding pixels 28 or shifted from the center of the corresponding pixels 28 to shelter direct light on the photosensor and to accommodate for predominant incident light angle. This angle is usually characterized by the Chief Ray Angle (CRA) of an optical system and depends on the location of the pixel relative to the optical center of the module.

As semiconductor-based image sensors are being used in even smaller and/or mobile applications, such as digital cameras and cellular phones, the required sensor pixel size is reduced to sizes smaller than 3 µm. This size reduction puts tighter requirements on alignment accuracy and dimensional stability of the imaging lens within lens barrel 26. Typically, the focal plane of the lens should not shift more than ±10 µm from focus position. Plastic lenses and mounts, typically used in current lens assemblies, show a strong variation of indices of refraction and mechanical dimensions depending upon the temperature, therefore the desired small focus shift is difficult to maintain while using plastic lenses. Glass lenses provide a much higher level of stability, but the cost is also much higher. The high cost of known methods of producing glass lenses can be prohibitive for implementing glass lenses in mobile image sensors. Accordingly, it is desirable to find an alternative low-cost solution for manufacturing a stable glass imaging lens system.

BRIEF SUMMARY OF THE INVENTION

The present invention provides a low-cost glass imaging lens system for a digital imager.

Exemplary embodiments of the invention provide a lens system including a first substantially hemispherical lens, a second spherical lens, and a third substantially hemispherical lens. The lenses are held together by a bonding material such as epoxy, which may also include a light absorbing dye. The invention also relates to a low-cost method of manufacturing the lens system using glass.

BRIEF DESCRIPTION OF THE DRAWINGS

The above described features of the invention will be more clearly understood from the following detailed description, which is provided with reference to the accompanying drawings.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

The present invention relates to a glass lens system for an imager and a low-cost manufacturing method for the lens system. Multi-element glass lens systems are an ideal solution for digital imagers. Glass lenses maintain better surface quality than plastic lenses and they do not experience shrinkage. However, conventional methods of fabricating glass lens systems can be very expensive and can make the use of these lens systems in digital imagers cost prohibitive.

As will be described below in more detail, the lens system of the invention comprises three to five glass elements juxtaposed without air gaps between them and bonded together with a bonding material. Although the lens elements are referred to as being made from "glass," they may also by made of any other transparent materials, such as quartz, rutile, sapphire, fused silica, or other like materials known in the art. The bonding material is referred herein to as an "epoxy," but the material may also be a thermoplastic, gel, or any other suitable bonding material known in the art.

Figure 3:
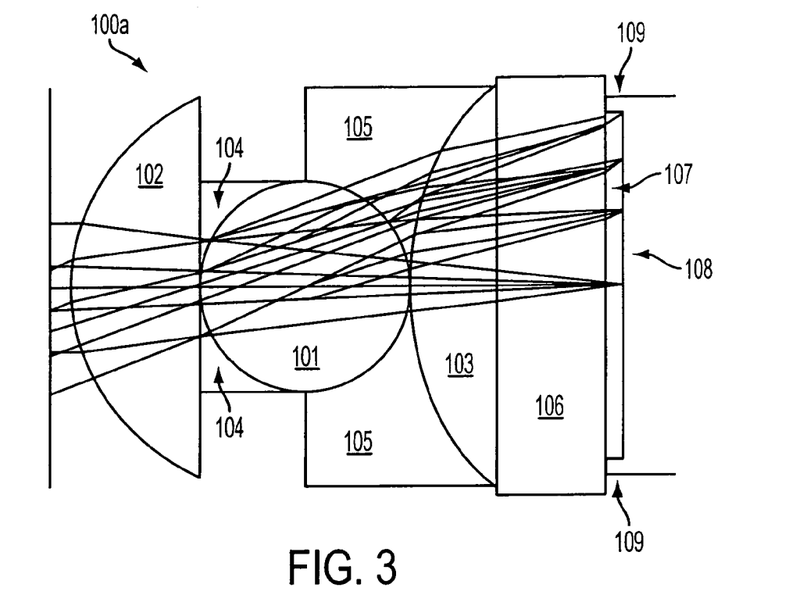
FIG. 3 depicts a lens system according to a first exemplary embodiment of the invention.

FIG. 3 depicts a cross-sectional view of the lens system 100a, according to a first exemplary embodiment of the invention. A central ball lens 101, made out of low refractive index glass, such as crown glass, is surrounded by higher refractive index epoxy 104, 105. The epoxy 104, 105 is an annular structure surrounding the ball lens 101. The epoxy 104, 105 is, in turn, positioned between two hemispherical lenses 102, 103 made out of high refractive index glass. The back hemispherical lens 103 is made out of heavy flint, which serves as a field flattener and limits the maximum chief ray angle (CRA) to an acceptable level, where the CRA determines the image size (as compared to the actual size of the object) from the imager. A flat glass plate cover glass 106 is positioned over an image sensor 108 with an air gap 107 between the cover glass 106 and the surface of the image sensor 108. The air gap 107 is maintained by posts 109 incorporated into the image sensor 108 during processing. The air gap 107 allows for focus adjustments after assembly of the lens system 100a, while at the same time provides the required air interface for proper operation of the microlenses 32 (FIG. 2B) on the surface of the image sensor 108. Focus adjustments may be made by shaving the length of posts 109 to the desired length.

High optical resolution can be achieved by selecting an appropriate combination of glass and epoxy materials for the lens system 100a. The differences in refractive indices of the glass and epoxy elements permit a wide field of view for the optical system and differences in dispersion allow for adequate correction of chromatic aberrations. High resolution of the lens system 100a may also be achieved by limiting the operating spectral range of each lens in the lens system 100a to one of three primary colors. The desired long-term optical performance stability under temperature, pressure, and humidity variations is achieved by selecting only environmentally stable glass, metal, and ceramic materials.

Figure 4:
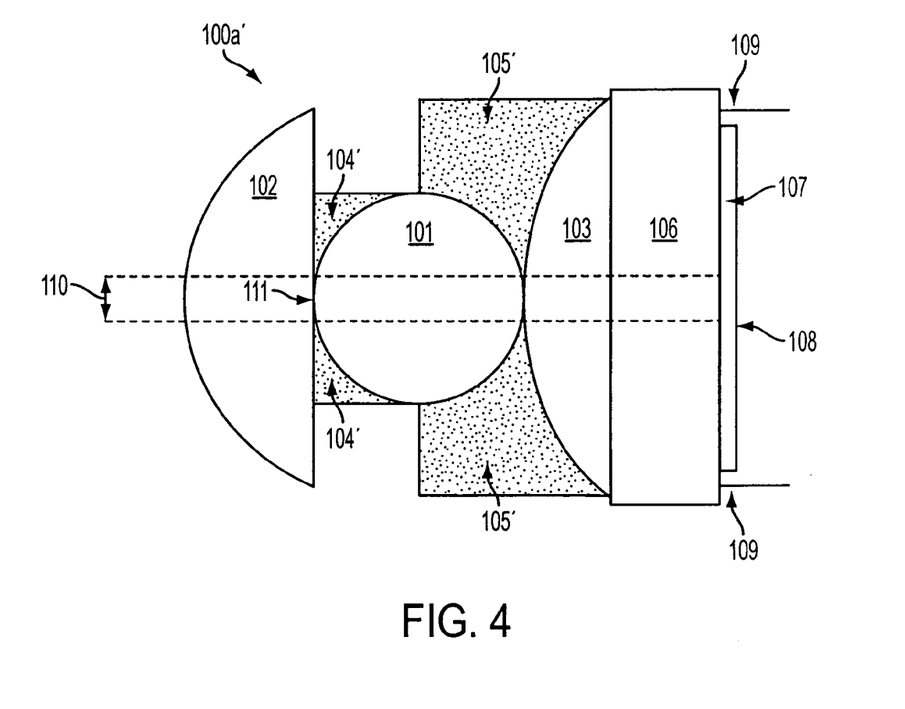
FIG. 4 depicts a lens system according to a second exemplary embodiment of the invention.

As shown in FIG. 4, a second embodiment of the lens system 100a' provides an apodized optical stop 111. An apodized optical stop 111 provides a smaller aperture 110 for the lens system 100a' than that in lens system 100a. This can be achieved by combining an appropriate amount of light absorbing dye with one or both of epoxies 104', 105' when the epoxy is being injected. The aperture 110 of the lens system 100a' is reduced (as compared to that of lens system 100a) by the inclusion of the light absorbing dye. FIG. 4 illustrates a lens system 100a', with dye on in both epoxy 104' and epoxy 105', however, as stated above, the dye may be injected in only one of epoxy 104' or 105', if desired.

Figure 5:
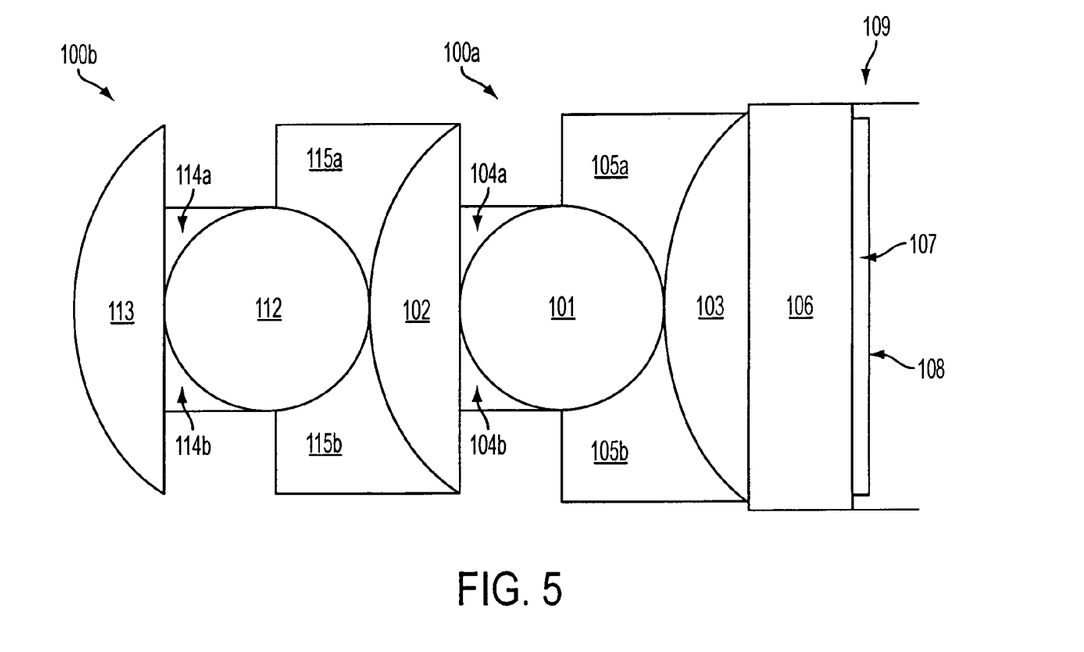
FIG. 5 depicts a lens system according to a third exemplary embodiment of the invention.
Figure 6:
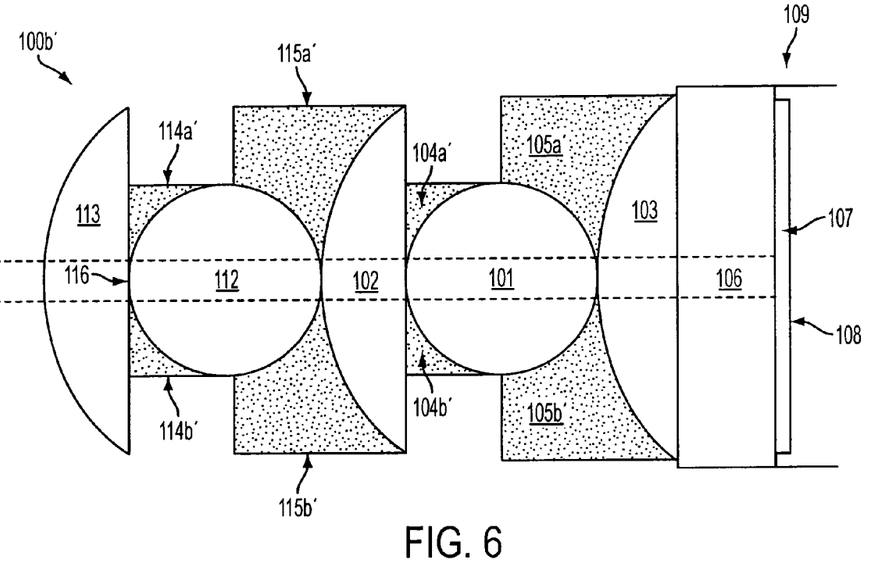
FIG. 6 depicts a lens system according to a fourth exemplary embodiment of the invention.

A third embodiment of the invention is shown in FIG. 5 and includes five glass elements as lenses 101, 102, 103, 112, 113. In addition to the structure of the lens system 100a of the first embodiment (FIG. 3), the lens system 100b of the third embodiment has an additional ball lens 112 and hemispherical lens 113 surrounded by annular epoxy 114, 115. As shown in FIG. 6, any one or more of epoxies 104', 105', 114', 115' of a fourth embodiment of the lens system 100b' may also be combined with a light absorbing dye to create an apodized optical stop 116, similar to in the second embodiment 100a' (FIG. 4).

An optical lens system designed in accordance with the present invention can provide a lens system with the following desireable characteristics: the lens system has a diagonal Field-of-View (FOV) of 10°–65° covering the range of imaging applications; the size of the imaging area for individual lenses corresponds to a format of ¼" or less; the lens resolution may achieve up to 40% modular transfer function (MTF) at 200 lines per millimeter; the optical design is compatible with a high accuracy manufacturing process, and has good stability under variable environmental conditions; the optical design allows for focus adjustments by incorporating an air gap between the back surface of the lens and the imaging plane; and the maximum chief ray angle (CRA) for the lenses is limited to under approximately 30 degrees.

Figure 7:
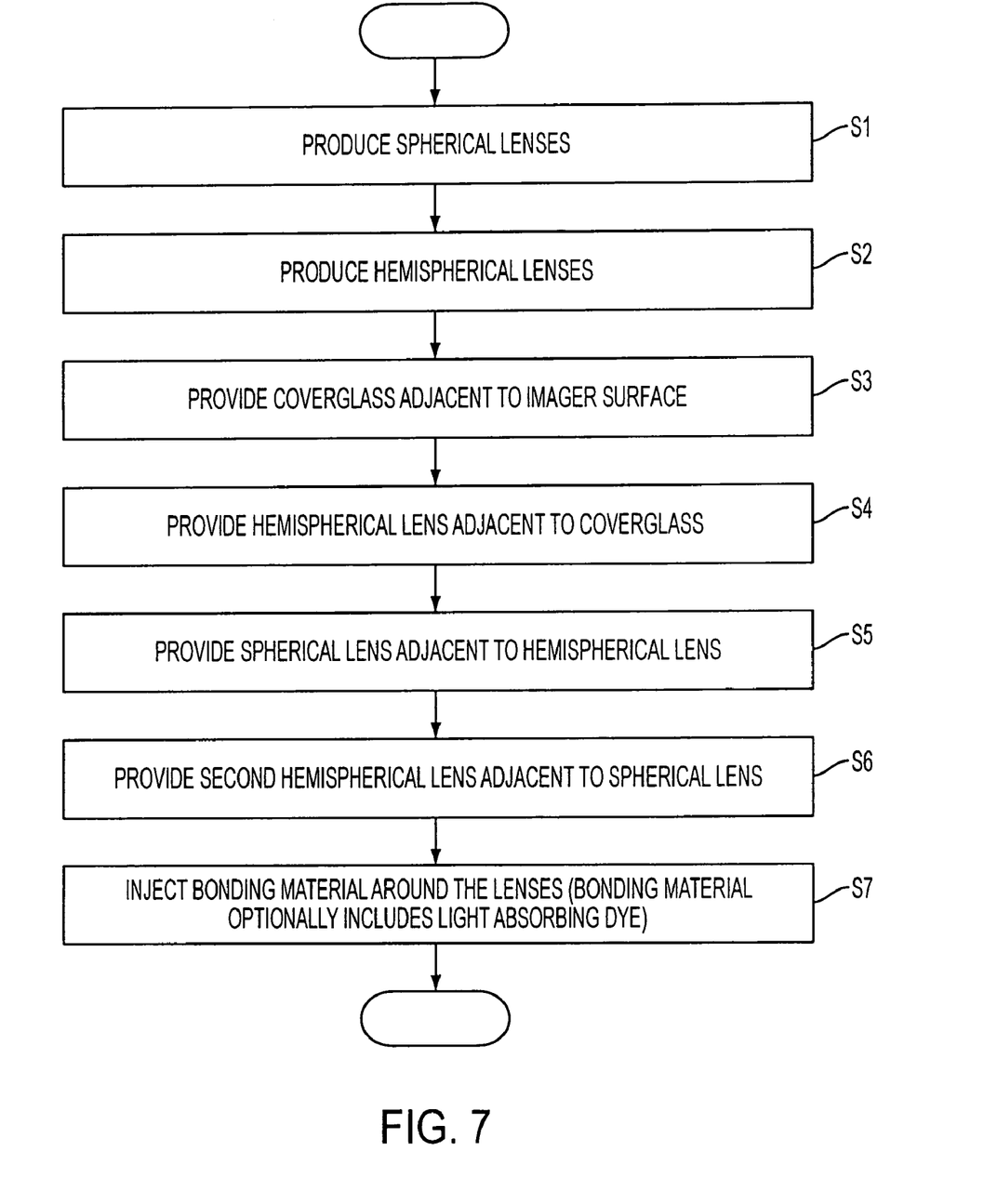
FIG. 7 is a flowchart for the manufacturing steps of the first and second exemplary embodiments of the invention.
Figure 8:
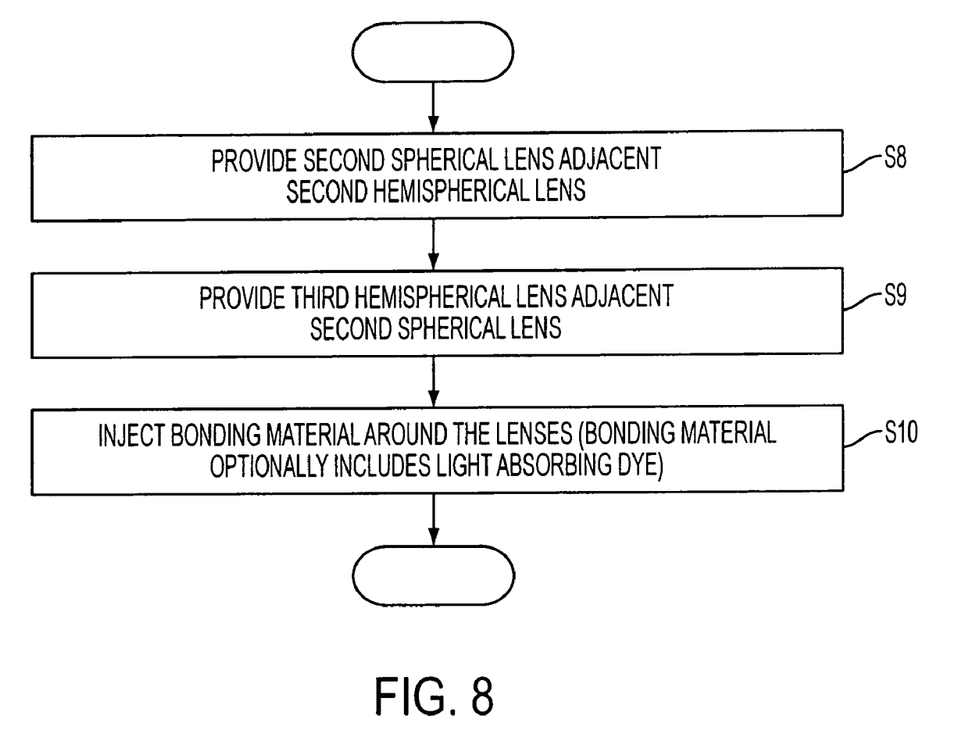
FIG. 8 is a flowchart, which is a continuation of the flowchart of FIG. 7, showing the additional manufacturing steps of the third and fourth exemplary embodiments of the invention.

As is described below in more detail, the method of fabricating the lens system of the present invention is low-cost and precise. The design of the present invention incorporates only ball lenses (spherical glass elements) and partially ground ball lenses, which can be manufactured with high precision. The process flow of manufacturing the lens system of the invention is illustrated in FIGS. 7 and 8.

Spherical glass ball lenses are produced in a conventional precision low-cost glass ball manufacturing process (having e.g., a 1 μm tolerance) in step S1. These glass ball lenses can be used as the spherical lenses 101, 112 of the various embodiments of the present invention. These spherical glass ball lenses can also be used to produce hemispherical lenses when ground and polished to a predetermined thickness, by a chemical mechanical polishing (CMP) process or similar, in step S2. It should be appreciated that the spherical glass ball lenses used as ball lenses 101, 112 may be made of a different type of material than those spherical glass ball lenses used to produce the hemispherical lenses at step S2. These hemispherical lenses are used as lenses 102, 103, 113 of the various embodiments of the present invention. The thickness of the hemispherical lenses 102, 103, 113 helps determine the focus of the various embodiments of the lens system.

The imaging lens systems 100a, 100a', 100b, 100b' of the present invention are designed for easy alignment and focus-free assembly. At step S3, a high-precision polished cover glass 106 is placed above the surface of the image sensor 108 at a precise height by placing it on the reference posts 109 incorporated into the silicon during the sensor's production. At step S4, the planar surface of hemispherical lens 103 is referenced against the cover glass 106, as can be seen in FIGS. 3, 4, 5, or 6. The central ball lens 101 has complete spherical symmetry, eliminating the need for angular alignment when placed between the two hemispherical lenses 102, 103 at step S5. At step S6, the second hemispherical lens 102 is provided adjacent to the central ball lens 101. The epoxy 104, 105 is then injected around the lenses 101, 102, 103 to secure the lens system 100a, at step S7. The epoxy 104, 105 provides correct indices of refraction for the lens system 100a, based on the choice of specific epoxy. The epoxy 104, 105 may be ultraviolet (UV) or temperature cured. Optionally, the epoxy 104, 105 may include a light absorbing dye.

Alternatively, an array of lens systems corresponding to an array of pixels may be manufactured. In this case, an array of spherical glass ball lenses can be installed into an array holder structure for grinding and polishing, at step S2, so that the resulting hemispherical lenses have collinear planar surfaces after polishing. At step S4, the array of hemispherical lenses 103 is provided adjacent the cover glass surface. At step S6, the entire array holder structure of hemispherical lenses 102 may be aligned at once by referencing a precise gap from the cover glass surface with control posts. The rest of steps S1, S3, S5 and S7 are completed as described above.

The resulting structure of the manufacturing flow process of FIG. 7 is the first exemplary embodiment of the invention 100a (FIG. 3). Optionally, during injection of the epoxy 104, 105, light absorbing dye may be combined with the epoxy 104', 105' to create the apodized optical stop 111 of the second embodiment 100a' (FIG. 4), if desired.

FIG. 8 illustrates the additional manufacturing steps required for lens system 100b with five lenses to be produced. An additional ball lenses 112 is provided adjacent to hemispherical lens 102 at step S8. At step S9, hemispherical lens 113 is provided adjacent to ball lens 112. At step S10, the lenses 112, 113 are surrounded by injected epoxy 114, 115 to create the lens system 100b (FIG. 5). Optionally, the lens system 100b' (FIG. 6) may be created with the inclusion of light absorbing dye in epoxies 114' and 115'.

Figure 9:
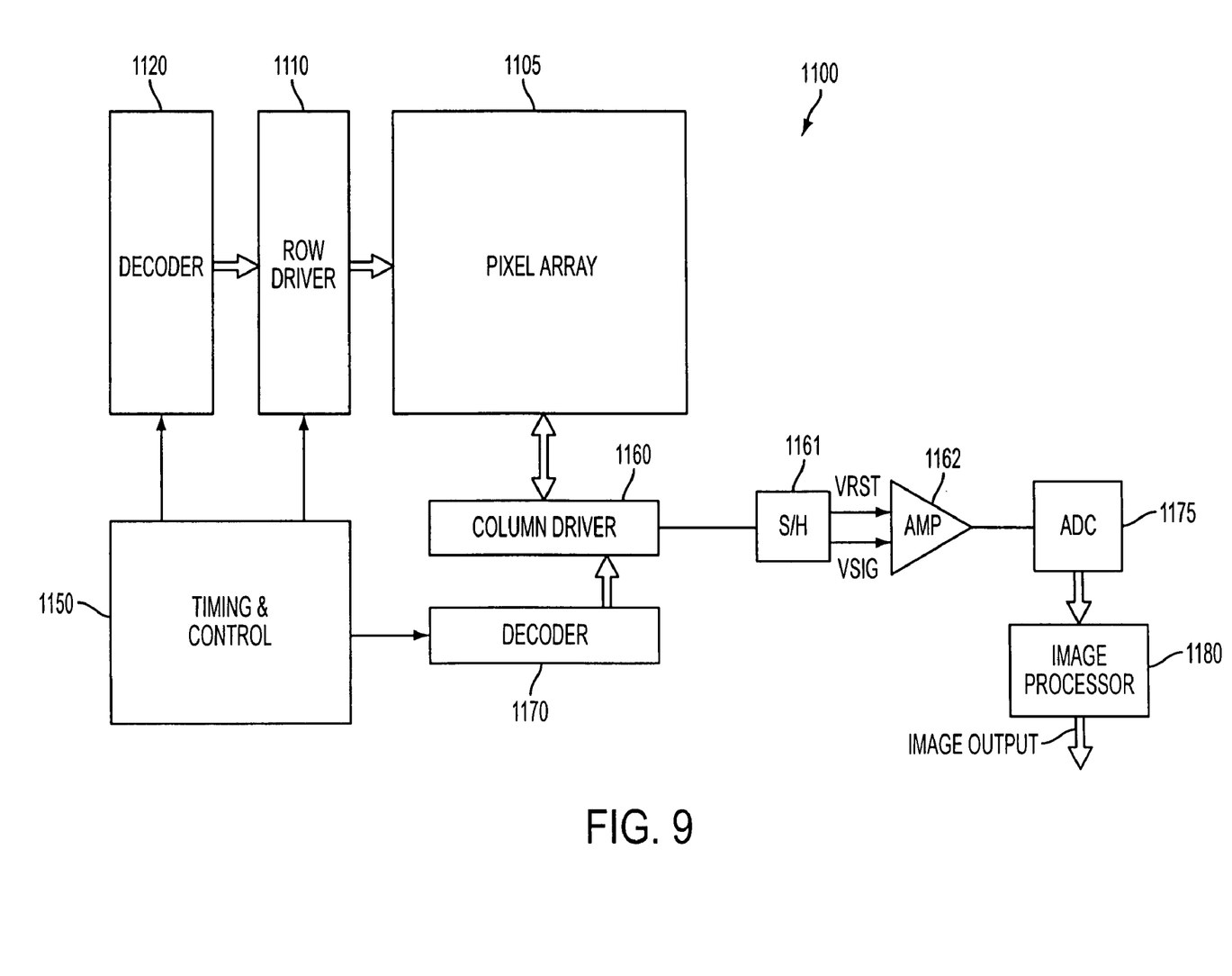
FIG. 9 illustrates a CMOS image sensor used in conjunction with an embodiment of the invention.

FIG. 9 illustrates an exemplary CMOS imager 1100 that may be utilized with the lens assembly of the invention focusing an image on a pixel array 1105. The CMOS imager 1100 pixel array 1105 may correspond to the pixel array 5 included on semiconductor die 4 of FIG. 1. The CMOS pixel array circuitry is conventional and is only briefly described herein. Row lines of the array 1105 are selectively activated by a row driver 1110 in response to row address decoder 1120. A column driver 1160 and column address decoder 1170 are also included in the imager 1100. The imager 1100 is operated by the timing and control circuit 1150, which controls the address decoders 1120, 1170 and row driver 1110.

A sample and hold circuit 1161 associated with the column driver 1160 reads a pixel reset signal Vrst and a pixel image signal Vsig for selected pixels. A differential signal (Vrst–Vsig) is amplified by differential amplifier 1162 for each pixel and is digitized by an analog-to-digital converter 1175 (ADC). The analog-to-digital converter 1175 supplies the digitized pixel signals to an image processor 1180 which forms and outputs a digital image.

Figure 10:
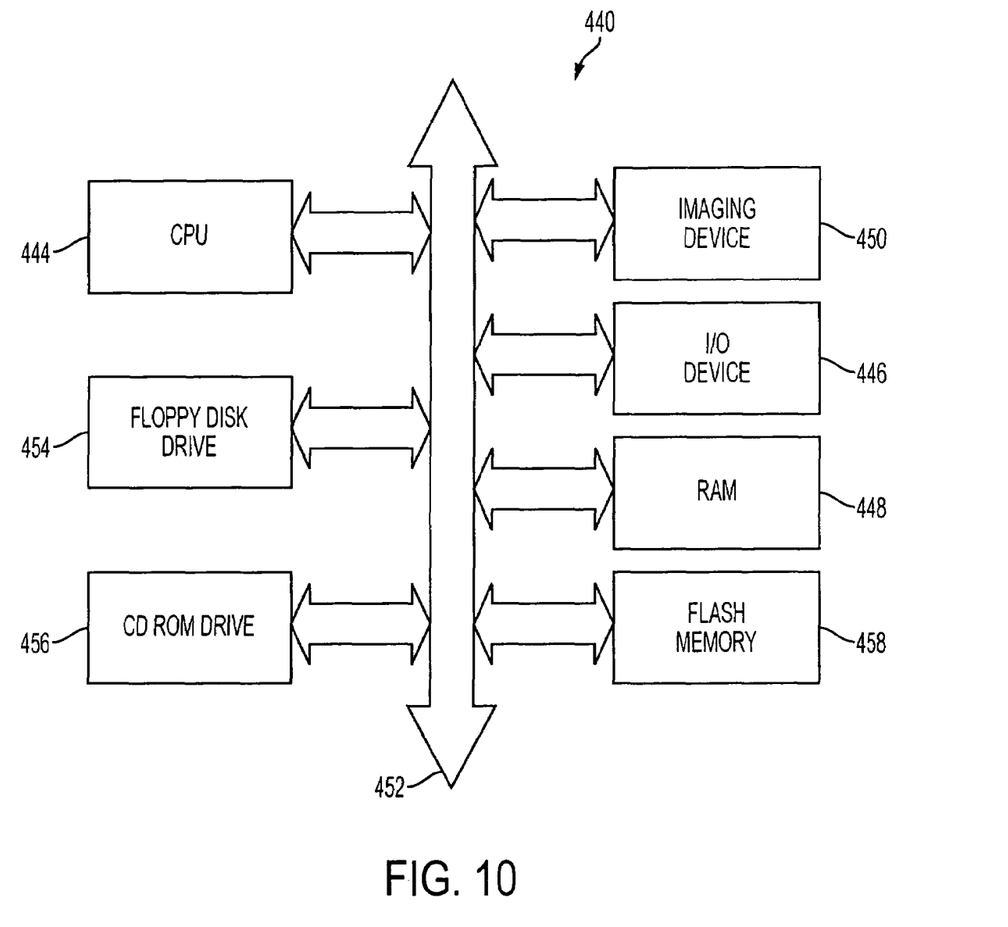
FIG. 10 is an illustration of a computer system having an imaging device with a lens system according to any embodiment of the invention.

FIG. 10 shows system 440, a typical processor system which includes an imaging device 450 (such as the imaging device 1100 illustrated in FIG. 9) of the invention. The processor system 440 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other systems employing an imager.

System 440, for example a camera system, generally comprises a central processing unit (CPU) 444, e.g., a microprocessor, that communicates with an input/output (I/O) device 446 over a bus 452. The system 440 includes an imaging device 450 having a lens system according to an embodiment of the invention. The imaging device 450 also communicates with the system 440 over bus 452.

The processor system 440 also includes random access memory (RAM) 448, and, in the case of a computer system may include peripheral devices such as a floppy disk drive 454, a compact disk (CD) ROM drive 456 or a flash memory 458 which also communicate with CPU 444 over the bus 452. The floppy disk drive 454, the CDROM drive 456 or flash memory 458 store images captured by imaging device 450. The imaging device 450 is constructed as an integrated circuit, with or without memory storage, and includes an imager lens system of the present invention.

Additionally, the lens system of the present invention could be placed in the lens barrel 26 of the image sensor module 2 of FIG. 1 in place of the conventional lens system.

As can be seen by the embodiments described herein, the present invention encompasses an imager lens system for use in a digital imager such as a CMOS imager or CCD imager.

The above description and drawings are only to be considered illustrative of exemplary embodiments which achieve the features and advantages of the invention. Although exemplary embodiments of the present invention have been described and illustrated herein, many modifications, even substitutions of materials, can be made without departing from the spirit or scope of the invention. Accordingly, the above description and accompanying drawings are only illustrative of exemplary embodiments that can achieve the features and advantages of the present invention. It is not intended that the invention be limited to the embodiments shown and described in detail herein. The invention is limited only by the scope of the appended claims.

What is claimed as new and desired to be protected by Letters Patent of the United States is:

1. A lens system comprising:
   a first lens comprising a convex surface and a substantially planar surface;
   a second lens, which is substantially spherical in shape;
   a third lens comprising a convex surface and a substantially planar surface; and
   a first support structure which supports one portion of the second lens to the convex surface of the first lens and another portion of the second lens to the planar surface of the third lens.

2. The lens system of claim 1, further comprising:
   a fourth lens, which is substantially spherical in shape;
   a fifth lens comprising a convex surface and a substantially planar surface; and
   a second support structure which supports one portion of the fourth lens to the convex surface of the third and another portion of the fourth lens to the planar surface of the fifth lens.

3. The lens system of claim 1, wherein the support structure is a first bonding material which is annularly formed around the second lens, the first bonding material being formed in a first section and a second section, the first and second sections being different.

4. The lens system of claim 2, wherein the support structure is a second bonding material which is annularly formed around the fourth lens, the second bonding material being formed in a third section and a fourth section, the fourth and fifth sections being different.

5. The lens system of claim 1, further comprising a flat plate optical element coupled to the substantially planar surface of the first lens.

6. The lens system of claim 5, wherein the flat plate element is a cover glass of a digital imager device.

7. The lens system of claim 3, wherein the second lens is a ball lens and a refractive index of the second lens is less than a refractive index of the first bonding material.

8. The lens system of claim 7, wherein the second lens comprises crown glass.

9. The lens system of claim 1, wherein the first lens is substantially hemispherical.

10. The lens system of claim 9, wherein the first lens comprises a material with a higher refractive index than a refractive index of the second lens.

11. The lens system of claim 10, wherein the material comprising the first lens comprises at least one of glass, quartz, rutile, sapphire, and fused silica.

12. The lens system of claim 1, wherein the third lens is substantially hemispherical.

13. The lens system of claim 12, wherein the third lens comprises a material with a higher refractive index than a refractive index of the second lens.

14. The lens system of claim 13, wherein the material comprising the third lens comprises at least one of glass, quartz, rutile, sapphire, and fused silica.

15. The lens system of claim 1, wherein the first lens comprises a heavy flint and serves as a field flattener.

16. The lens system of claim 3, wherein the first bonding material is epoxy.

17. The lens system of claim 3, wherein the first bonding material comprises a light absorbing dye in at least one of the first section and the second section of the first bonding material.

18. The lens system of claim 17, wherein the first bonding material comprises a light absorbing dye in both the first section and the second section of the first bonding material.

19. The lens system of claim 4, wherein the fourth lens is a ball lens and a refractive index of the fourth lens is less than a refractive index of the second bonding material.

20. The lens system of claim 19, wherein the fourth lens comprises crown glass.

21. The lens system of claim 2, wherein the fifth lens is substantially hemispherical.

22. The lens system of claim 21, wherein the fifth lens comprises a material with a higher refractive index than a refractive index of the fourth lens.

23. The lens system of claim 22, wherein the material comprising the fifth lens comprises at least one of glass, quartz, rutile, sapphire, and fused silica.

24. The lens system of claim 4, wherein the second bonding material is epoxy.

25. The lens system of claim 4, wherein the second bonding material comprises a light absorbing dye in at least one of the third section and the fourth section of the second bonding material.

26. The lens system of claim 24, wherein the second bonding material comprises a light absorbing dye in both the third section and the fourth section of the second bonding material.

27. An imager system comprising:
a first lens comprising a convex surface and a substantially planar surface coupled to a cover glass of a digital imager device, the first lens having a first refractive index;
a second lens, substantially spherical in shape, a portion of which is coupled to the convex surface of the first lens, the second lens being a crown glass ball lens and having a second refractive index;
a third lens comprising a convex surface and a substantially planar surface, the substantially planar surface of the third lens coupled to another portion of the second lens, the third lens having a third refractive index, wherein the second refractive index is lower than the first and third refractive indices;
a support structure which serves to couple the first, second, and third lenses; and
an imager for capturing an image through the imager lens system, wherein the imager lens system comprises the first, second and third lenses.

28. The imager system of claim 27, wherein the support structure is a bonding material.

29. The imager system of claim 27, wherein the imager lens system further comprises:
a fourth lens, substantially spherical in shape a portion of which is coupled to the convex surface of the third lens, the fourth lens being a crown glass ball lens; and
a fifth lens comprising a convex surface and a substantially planar surface, the substantially planar surface of the firth lens coupled to another portion of the fourth lens, and wherein the support structure further serves to couple the third, fourth, and fifth lenses.

30. An imager system comprising:
a digital image-capture device comprising a sensor surface having a plurality of micro-lenses associated with a plurality of photosensors; and
a lens system comprising:
a first lens comprising a convex surface and a substantially planar surface;
a second lens, which is substantially spherical in shape;
a third lens comprising a convex surface and a substantially planar surface; and
a support structure which supports one portion of the second lens to the convex surface of the first lens and another portion of the second lens to the planar surface of the third lens;
wherein the digital-image capture device and the lens system are optically aligned with a layer of air between them.

31. The imager system of claim 30, wherein the support structure is a first bonding material which is annularly formed around the second lens, the first bonding material being formed in a first section and a second section, the first and second sections being different.

32. The imager system of claim 30, wherein the lens system further comprises:
a fourth lens, which is substantially spherical in shape;
a fifth lens comprising a convex surface and a substantially planar surface; and
a second supporting structure which supports one portion of the fourth lens to the convex surface of the third lens and another portion of the fourth lens to the planar surface of the fifth lens.

33. The imager system of claim 32, wherein the support structure is a second bonding material which is annularly formed around the fourth lens, the second bonding material being formed in a third section and a fourth section, the third and fourth sections being different.

34. The imager system of claim 31, wherein the second lens is a ball lens and a refractive index of the second lens is less than a refractive index of the first bonding material.

35. The imager system of claim 30, wherein the first lens is substantially hemispherical and comprises a material with a higher refractive index than a refractive index of the second lens.

36. The imager system of claim 30, wherein the third lens is substantially hemispherical and comprises a material with a higher refractive index than a refractive index of the second lens.

37. The imager system of claim 30, wherein the first lens comprises a heavy flint and serves as a field flattener.

38. The imager system of claim 31, wherein the first bonding material is epoxy.

39. The imager system of claim 31, wherein the first bonding material comprises a light absorbing dye in at least one of the first section and the second section of the first bonding material.

40. The imager system of claim 33, wherein the second bonding material comprises and light absorbing dye in at least one of the third section and the fourth section of the second bonding material.

41. An image capture module comprising:
a semiconductor die;
a pixel array included on the semiconductor die, for capturing an image; and
a lens system, through which the imager views an image, the lens system optically aligned with the pixel array and comprising:
  a first lens comprising a convex surface and a substantially planar surface;
  a second lens, which is substantially spherical in shape;
  a third lens comprising a convex surface and a substantially planar surface; and
  a first bonding material that bonds one portion of the second lens to the convex surface of the first lens and another portion of the second lens to the planar surface of the third lens, wherein the first bonding material surrounds the second lens.

42. The image capture module of claim 41, further comprising:
a lens assembly comprising a housing which supports a lens barrel containing the lens system.

43. The image capture module of claim 41, further comprising:
bump pad connectors located adjacent to the edges of a top surface of the semiconductor die;
a conductive film adjacent to the bump pad connectors;
a flex tape adjacent to the conductive film, the flex tape including electrical traces and an opening through which light may travel to the pixel array; and
a connector adjacent and electrically connected to the flex tape.

44. A method of producing an imager lens system comprising:
providing a cover glass adjacent an imager surface;
providing a first lens adjacent the cover glass, wherein the first lens comprises a convex surface and a substantially planar surface;
providing a second lens adjacent the first lens, wherein the second lens is substantially spherical in shape and wherein the convex surface of the first lens is coupled to one portion of the second lens;
providing a third lens adjacent the second lens, wherein the third lens comprises a convex surface and a substantially planar surface and wherein the planar surface of the third lens is coupled to another portion of the second lens; and
coupling the first, second and third lenses together.

45. The method of claim 44, further comprising injecting a first bonding material around the first, second and third lenses to bond the lenses, while maintaining an optical path through the first, second and third lenses.

46. The method of claim 44, further comprising:
providing a fourth lens adjacent the third lens wherein the fourth lens is substantially spherical in shape and wherein the convex surface of the third lens is coupled to one portion of the fourth lens;
providing a fifth lens adjacent the fourth lens, wherein the fifth lens comprises a convex surface and a substantially planar surface and wherein the planar surface of the fifth lens is coupled to another portion of the fourth lens; and
coupling the third, fourth and fifth lenses together.

47. The method of claim 46 further comprising injecting a second bonding material around the third, fourth, and fifth lenses to bond the lenses while maintaining an optical path through the first, second, third, fourth and fifth lenses.

48. The method of claim 44, wherein the cover glass is provided at a predetermined distance from the imager surface by means of posts of the predetermined distance incorporated into the imager surface.

49. The method of claim 44, wherein the substantially planar surface of the first lens is coupled with the cover glass.

50. The method of claim 45, wherein the first bonding material is epoxy.

51. The method of claim 50, wherein the epoxy is ultraviolet cured.

52. The method of claim 50, wherein the epoxy is temperature cured.

53. The method of claim 45, wherein the first bonding material comprises a light absorbing dye.

54. The method of claim 47, wherein the second bonding material is epoxy.

55. The method of claim 54, wherein the epoxy is ultraviolet cured.

56. The method of claim 55, wherein the epoxy is temperature cured.

57. The method of claim 47, wherein the second bonding material comprises a light absorbing dye.

58. The method of claim 44, wherein the second lens is provided from a glass ball lens manufacturing process.

59. The method of claim 44, wherein the first and third lenses are provided from ball lenses ground and polished on one side to a predetermined thickness.

60. The method of claim 59, wherein the grinding and polishing is done by a chemical mechanical polishing process.

61. The method of claim 59, wherein a plurality of ball lenses is placed in an array holder to allow for simultaneous grinding and polishing of the plurality of ball lenses.

62. The method of claim 61, wherein the array holder holding the plurality of ball lenses is placed between large plates and simultaneously ground and polished to the predetermined thickness.

63. The method of claim 62, wherein the predetermined thickness of the lenses is controlled with posts and end-point detectors installed between the plates.

* * * * *

UNITED STATES PATENT AND TRADEMARK OFFICE
CERTIFICATE OF CORRECTION

| | | |
|---|---|---|
| PATENT NO. | : 7,215,479 B1 | Page 1 of 1 |
| APPLICATION NO. | : 11/350772 | |
| DATED | : May 8, 2007 | |
| INVENTOR(S) | : Dmitry Bakin | |

It is certified that error appears in the above-identified patent and that said Letters Patent is hereby corrected as shown below:

Column 2, line 26, "as" should read --a--; and

Column 3, line 14, "by" should read --be--.

In the Claims, the following errors are corrected:

Claim 29, column 8, line 18, "firth" should read --fifth--; and

Claim 40, column 9, line 10, "comprises and" should read --comprises a--.

Signed and Sealed this

Twentieth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,215,479 B1  
APPLICATION NO. : 11/350772  
DATED : May 8, 2007  
INVENTOR(S) : Dmitry Bakin Page 1 of 1

It is certified that error appears in the above-identified patent and that said Letters Patent is hereby corrected as shown below:

Claim 3, column 6, line 53, "the support" should read --the first support--;

Claim 4, column 6, line 58, "the support" should read --the second support--;

Claim 4, column 6, line 62, "fourth and fifth sections" should read --third and fourth sections--;

Claim 56, column 10, line 37, "method of claim 55" should read --method of claim 54--; and Claim 62, column 10, line 55, "between large plates and simultaneously ground" should read --between large plates and the plurality of ball lenses are simultaneously ground--.

Signed and Sealed this

Thirtieth Day of June, 2009

JOHN DOLL  
*Acting Director of the United States Patent and Trademark Office*